United States Patent

[11] 3,619,323

| [72] | Inventor | Leo F. Stebleton<br>Midland, Mich. |
| --- | --- | --- |
| [21] | Appl. No. | 773,819 |
| [22] | Filed | Nov. 6, 1968 |
| [45] | Patented | Nov. 9, 1971 |
| [73] | Assignee | Dow Corning Corporation<br>Midland, Mich. |

[54] METHOD OF BONDING SILICONES TO SILICONES
9 Claims, 4 Drawing Figs.

[52] U.S. Cl............................................. 156/292, 156/309, 156/329
[51] Int. Cl. .................................................. B29h 7/04
[50] Field of Search........................................ 156/309, 292, 329; 161/206, 208

[56] References Cited
UNITED STATES PATENTS
3,262,830  7/1966  Vincent.................... 156/329
3,455,762  7/1969  Harper..................... 156/329 X
3,503,925  3/1970  Griffin...................... 156/329 X

*Primary Examiner*—Benjamin R. Padgett
*Assistant Examiner*—Stephen J. Lechert, Jr.
*Attorneys*—Robert F. Fleming, Jr., Laurence R. Hobey, Harry D. Dingman and Howard W. Hermann ABSTRACT: A cured silicone can be bonded to itself or to other cured silicones without the use of primers or materials requiring curing by means of a fusible silicon-containing material, such as a silarylenesiloxane block copolymer. A film or coating of the fusible silicon-containing material can be applied directly to the surfaces to be joined, or a separate film of that material can be placed between the surfaces. Heat is then applied to the fusible material causing it to become tacky and to adhere to the surfaces to be joined when they are pressed together. On cooling of the fusible material, the surfaces are securely bonded together by the fusible material.

PATENTED NOV 9 1971 3,619,323

INVENTOR
LEO F. STEBLETON
BY Howard W. Hermann
ATTORNEY

METHOD OF BONDING SILICONES TO SILICONES

BACKGROUND OF THE INVENTION

The present invention relates generally to the field of bonding surfaces together and, more particularly to the bonding of cured silicones to other cured silicones.

The usefulness of fusible materials for bonding two or more surfaces together has long been known to man. For example, sealing wax consisting mainly of beeswax has been used for sealing letters and documents since the medieval period. When heat is applied to the wax, it becomes plastic and adheres to the desired surfaces of the letter to be sealed. When the wax is subsequently allowed to cool, it returns to a rigid state, thereby sealing the surfaces of the letter together.

However, when it is desired to bond silicone materials to themselves or to other silicone materials, the excellent release characteristics of silicone materials prevents the use of commonly known fusible materials for that purpose. That is, the fusible material will not adhere to the silicone material and therefore cannot be used for the bonding of silicone materials.

The release characteristics of silicone materials are well known and documented. The book *Silicones and Their Uses*, R. R. McGregor, LC53–6046, pp. 65–69, lists several commercial applications of the release characteristics of silicones. Experience has shown that silicones give good release for rubber moldings, plastic moldings and even metal die castings. McGregor also states on p. 70 of the above-cited book that silicones are even used to provide a nonstick surface for heating irons used in the heat-sealing of plastics, allowing the iron to come away cleanly from the thermoplastic.

Uncured silicone materials can be bonded to other silicones by applying special priming resins to the surfaces to be bonded and then following the normal curing schedule of the uncured silicone material. Similarly, cured silicone materials have been successfully bonded to other cured silicone materials by placing a sheet of uncured silicone stock between the two surfaces to be joined and then curing this assembly under continuous heat and pressure. More recently, a paste, or adhesive, of room temperature vulcanizing silicone resin has been used in place of the sheet of uncured silicone stock. For many applications this method of bonding cured silicone materials is adequate, but for many other applications it is totally inadequate.

Silicone materials are now commonly used in devices implanted in a human body. The sheets of uncured silicone stock and the room temperature vulcanizing adhesives used in the above-mentioned methods almost always contain vulcanizing agents or catalysts, such as peroxides, which are not readily tolerated by the human body. Thus, silicone materials bonded by such a method cannot be implanted in a human body. Likewise, these vulcanizing agents or catalysts are detrimental to blood and therefore cannot be used in blood oxygenators external to the human body.

Further, the above-mentioned methods are adequate when the surfaces to be joined are short or small in size and relatively long periods of time are available for bonding the surfaces together. But, when it is desired to join cured silicone surfaces together in a continuous automated process or to join relatively long surfaces of cured silicone material, the above-mentioned method is unworkable because of the relatively long curing time required and the difficulty encountered in applying long term heat and continuous pressure to long surfaces of silicone material. Of course, such a method can be automated, but the cost of building the necessary equipment, and the cost of operating that equipment make such automation economically unfeasible.

SUMMARY OF THE INVENTION

The primary object of the present invention, therefore, is to provide an improved method of bonding cured silicone materials to cured silicone materials, which method will be free from the aforementioned and other disadvantages of methods thereof.

More particularly, it is an object of the present invention to provide a method of bonding cured silicone materials to cured silicone materials, which method can be performed in a continuous automated process that is both economical and efficient.

Another object is to provide a method of bonding silicone materials using materials suitable for implantation within a human body.

Still another object is to provide an efficient and economical method by which to fabricate an envelope or membrane for an artificial human organ.

In accordance with these and other objects, there is provided by the present invention a method of bonding a cured silicone material to itself or to another cured silicone material, without the use of primers or materials requiring curing. A fusible silicon-containing material is placed between the surfaces to be bonded together. Ordinary heat sealing techniques may then be used to fuse the fusible material, thereby causing that material to adhere to the surfaces to be bonded. When the fusible material is subsequently cooled, it continues to adhere to the surfaces to be bonded and thereby bonds them securely together. Use of a suitable fusible material obviates the need for the use of long term heat and continued pressure to cure the material after the surfaces are bonded. Silarylenesiloxane block copolymer films or coatings can be used as the fusible silicon-containing material, and they are suitable materials for implantation within a human body.

BRIEF DESCRIPTION OF THE DRAWINGS

Other objects and advantages will become obvious to those skilled in the art by reading the following detailed description in connection with the accompanying drawings wherein.

DESCRIPTION OF THE PREFERRED EMBODIMENTS

Figures 1, 2:
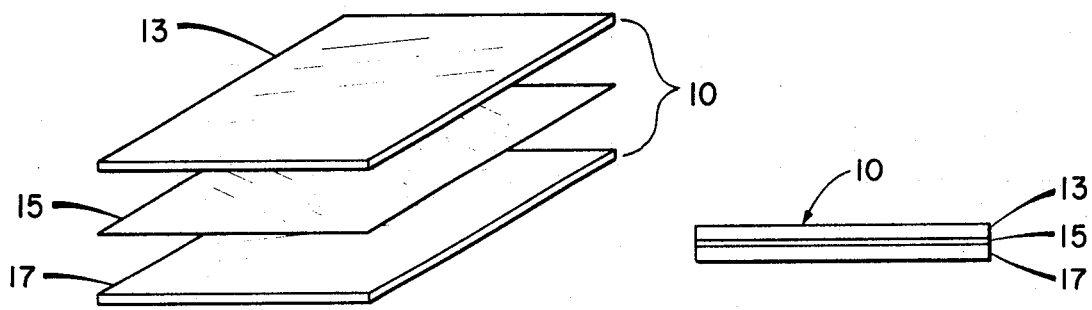
FIG. 1 is an exploded view showing the relationship of the materials of an embodiment of the present invention prior to their being bonded together.
FIG. 2 is an end view in elevation of the materials in FIG. 1 after the method of the present invention has been performed on them.

Referring now to the drawings, wherein like reference numerals designate like or corresponding parts throughout the figures thereof, there is shown in FIG. 1 an assembly, shown generally as 10, of a cured silicone material 13, a fusible silicon-containing material 15 and a cured silicone material 17 to which the material 13 is to be bonded. The silicone material 13 can be exactly the same material as silicone material 17 if desired, but the two silicone materials can also be chemically different if desired.

The fusible silicon-containing material 15 can be either a separate film or alternatively a dispersion of such material can be used to coat one or both of the surfaces 13 and 17. In addition to being fusible, the material 15 must be nontacky at temperatures substantially below its melting point. That is, the fusible material 15 must not be tacky when it is at temperatures substantially below its melting point, since such a tacky material would attract and adhere to matter extraneous to the surfaces to be bonded. However, since the exact melting point of a polymer is often difficult to determine, tackiness a few degrees below the melting point can be expected and tolerated.

Further, the fusible material 15 chosen must have a melting point higher than the temperature of the environment in which the bonded surfaces are to be used and lower than the temperature at which the surfaces to be bonded would begin to deteriorate or melt. In most instances, this lower limit would be about room temperature or 20° C., and the upper limit would be about 300° C. Likewise, the material 15 must not require curing to make it chemically or physically acceptable after it has been used in the process of the present invention.

The material 15 can be any of the silarylenesiloxane block copolymers taught in U.S. Pat. No. 3,398,175, issued to R. L. Merker and incorporated herein by reference, but it is not limited thereto. More particularly, the fusible material 15 can be one of the organosiloxane block copolymers exhibiting polymeric crystallinity at 25° C. and in which the copolymeric molecules consist essentially of (A) amorphous segments consisting of repeating units of the formula $R'_2SiO$ and (B) crystallite segments consisting of repeating units of the formula $-Si(R)_2Z(R)_2SiO-$, where each R' selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4'-biphenylene, 4,4'-diphenylene ether, 4,4'-dimethylene benzene and 4,4'-dimethylenediphenyl ether radicals.

Since crystallinity in a polymer is not always easily detected, particularly as the polymer configuration moves ever closer to a purely amorphous state, the copolymers of this invention can also be defined as block copolymers of the above defined (A) and (B) units wherein at least 5 mole percent of the total units are (B) units. In particular, the material 15 can be a film of the organosiloxane block copolymer represented by the formula

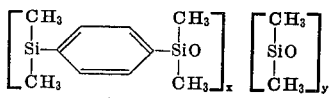

wherein $x$ has a value such that its mole percent is 25 percent, and $y$ has a value such that its mole percent is 75 percent.

Once the materials are placed in the assembly 10 as shown, any available heat-sealing equipment can be used to bond the surfaces 13 and 17 together. Such equipment is well known in the prior art and includes flatirons, heated rollers or wringers, spot welders and even laser beams. The available heat-sealing equipment is used to raise the temperature of the fusible material 15 to the point at which it will fuse. When the material 15 is allowed to cool, it will return to its earlier rigid form. When the above-described specific copolymer was used as the material 15, it was found that heating the assembly 10 to between 140° C. and 150° C. caused the material 15 to become tacky and physically adhere to the silicone materials to be bonded. As is well known in the art of heat-sealing, the heating, adhering, and cooling described above may be achieved in a matter of seconds, in most cases.

Naturally, the material 15 cannot adhere to the materials 13 and 17 unless they are physically in contact. Preferably, the necessary pressure needed to bring these materials into intimate contact can be provided by the same device, an iron for example, that provides the necessary heat to fuse the fusible material 15.

FIG. 2 shows the assembly 10 after the fusible material 15 has been heated and cooled, thereby bonding the surfaces of silicone material 13 and 17 together. Further, FIG. 2 illustrates two sheets of cured silicone 13 and 17 bonded together at each point on those surfaces. However, it is to be understood that the method of this invention can also be used to join surfaces only at certain spots or over certain areas. Likewise, the surfaces to be joined do not need to be flat sheets, but can also be surfaces of spheres, cylinders, cones etc., if so desired.

Figures 3, 4:
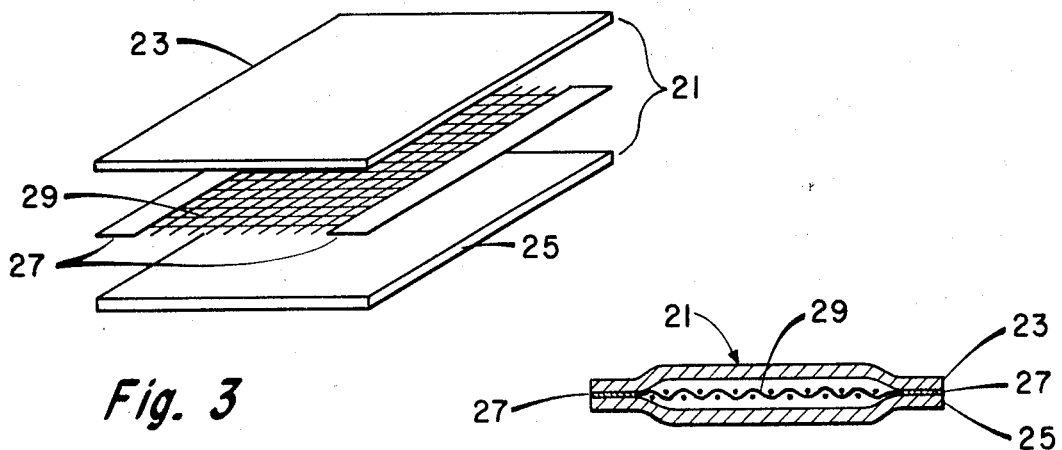
FIG. 3 is an exploded partial view of the materials used in making an artificial human blood oxygenator membrane or envelope according to the method of the present invention.
FIG. 4 is an end view in cross section of the materials in FIG. 3 after the method of the present invention has been performed on them.

In FIG. 3, there is an assembly, shown generally as 21, of the material used to fabricate the "envelope" of a Kolobow artificial membrane lung. A description of the artificial lung designed by Dr. Kolobow can be found in *The Bulletin of the Dow Corning Center For Aid To Medical Research*, Volume 6, Number 1, Jan. 1964. Such an "envelope" consists essentially of an approximately 24-feet long tube of medical grade silicone rubber enveloped around an equally long strip of, preferably, vinyl-coated Fiberglas screen. Medical grade silicone rubbers are compounded from polydimethylsiloxane polymers. There is some methylvinylsiloxane substitution to provide for efficient vulcanization. The vulcanization byproducts are fugitive and are driven off in a conventional oven-curing procedure, leaving the resultant rubbers free of contaminants and physiologically acceptable.

This 37 envelope" is then tightly wound into a snaillike spiral and placed into a suitable container. Because of its great length and, further, because of the fact that blood is passed over it, the Kolobow blood oxygenator "envelope" can most conveniently be fabricated by the method of the present invention, for the reasons stated as the objects and advantages of this invention. Additionally, the screen material would melt at the temperatures required to fabricate the envelope, if normal heat vulcanized materials were used.

Accordingly, there is shown in FIG. 3 a pair of cured, medical grade silicone rubber membranes 23 and 25 between which is sandwiched a pair of fusible silicon-containing materials 27 and a spacer made from a strip of preferably, vinyl-coated Fiberglas screen 29. The fusible material 27 chosen must have a melting temperature greater than the average human body temperature of 37° C. and less than about 300° C., which is the temperature at which the silicone membranes can start to deteriorate and other factors affecting the economics of heat-sealing come into play. Likewise, the fusible material 27 must be nontacky at temperatures substantially below its melting temperature. Further, the material 27 must not require curing to make it biologically acceptable after it has been used in the process of the present invention.

The assembly 21 is then bonded together according to the method of the present invention as described hereinabove for the materials of FIG. 1. FIG. 4 represents a cross section of an end view of the completed "evelope," when the "envelope" has been so bonded.

Preferably, the screen is not bonded to the silicone rubber membranes, but is snugly enveloped by them, as shown in FIG. 4. However, the screen 29 can be bonded to the membranes by the strips 27 if desired, or a second pair of fusible silicon-containing strips may be placed below the screen 29 in the assembly 21. Generally, such a second pair is unnecessary, however, since, when placed over the screen 29, the fused material 27 will flow through and around the screen 29, thereby providing a secure bond between both membranes 23 and 25 and the screen 29.

EXAMPLE 1

An envelope as described hereinabove for a Kolobow artificial membrane lung was fabricated as follows: A strip of fusible, silicon-containing film, approximately 0.375 inches wide and 0.005 inches thick and 24 feet long was placed adjacent each lateral edge of a spacer screen which was 23 feet long, 4.00 inches wide and 0.030 inches thick and made of vinyl-coated Fiberglas. The fusible material was made from an organosiloxane block copolymer having a melting point of 130° C. and consisting of

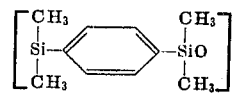

units in an amount of 25 mole percent in blocks having an average of 33 repeating units per block, and $(CH_3)_2SiO$ units in an amount of 75 mole percent in blocks having an average of 100 repeating units per block. A sheet of medical grade silicone rubber made from dimethylsiloxane 24 feet long, 4.75 inches wide and 0.004 inches thick was then placed over and under the strips and screen and in contact therewith. An iron heated to 150° C. was then moved slowly over each lateral edge of this assembly (i.e. each point on the surface received heat for about 10 seconds), whereby the fusible silicon-containing material was caused to fuse and adhere to both silicone rubber sheets. After the fused material was allowed to cool, the silicone rubber sheets were found to be securely bonded together by the fusible material and the spacer screen snugly enveloped by the bonded sheets.

EXAMPLE 2

The fusible silicon-containing material of example 1 can be 3 organosiloxane block copolymer having a melting point of 138° C. and consisting of
0003

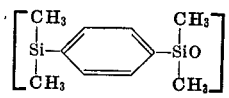

units in an amount of 20 mole percent in blocks having an average of 50 repeating units per block, and $(CH_3)_2SiO$ units in an amount of 80 mole percent in blocks having an average of 200 repeating units per block. With this material, the iron was maintained at 150° C. to obtain the desired fusing and subsequent bonding.

EXAMPLE 3

The fusible silicon-containing material of example 1 can be organosiloxane block copolymer having a melting point of 135° C. and consisting of
0004

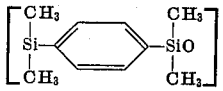

units in an amount of 10 mole percent in blocks having an average of 40 repeating units per block, and $(CH_3)_2SiO$ units in an amount of 90 mole percent in blocks having an average of 360 repeating units per block. With this material, the iron was also maintained at 150° C. to obtain the desired fusing and subsequent bonding.

From the teachings of this specification, it will be readily apparent that the films 15 or 27 can also be bonded to themselves or other films of the same material by simply placing together the desired surfaces to be bonded and applying the same heat-sealing techniques as described herein to those surfaces.

While it is to be understood that the silicone materials to be joined together can be uncured, the method of the present invention might not be as advantageous in such instances, since the uncured materials must eventually be cured and most likely could be joined by other known methods.

Having now described the invention in specific detail and exemplified the manner in which it may be carried into practice, it will be readily apparent to those skilled in the art that innumerable variations, applications, and modifications of the basic principles involved may be made without departing from its spirit or scope.

That which is claimed is:

1. A method of bonding a surface of a silicone material to another surface of a silicone material, comprising:
    providing a fusible silicon-containing material having a melting point lower than the temperature at which either said silicone material would melt or deteriorate but higher than the temperature of the evironment in which said silicone materials are to exist and being nontacky at temperatures substantially below said melting point,
    said fusible silicon-containing material being a soluble organosiloxane block copolymer exhibiting polymeric crystallinity at 25° C. and in which the copolymeric molecules consist essentially of (A) amorphous segments consisting of linked repeating units of the formula $R'_2SiO$ having an average minimum number of at least 10 units of $R'_2SiO$ and (B) crystallite segments consisting of linked repeating units of the formula $-Si(R)_2Z(R)_2SiO-$ having an average minimum number of at least 3 units of $-Si(R)_2Z(R)_2SiO-$, where each R' is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of P-phenylene, 4,4'-biphenylene, 4,4'-dephenylene ether, 4,4'-dimethylene benzene, and 4,4'-dimethylenediphenyl ether radicals, the molar ratio of total $R'_2SiO$ units to total $-Si(R)_2Z(R)_2SiO-$units ranging from 10:90 to 95:5,
    placing said fusible material between and in contact with the surfaces to be bonded, and
    applying heat to said fusible material sufficient to cause said material to fuse and adhere to said surfaces to be bonded, whereby said surfaces are securely bonded together.

2. A method of fabricating an envelope for an artificial organ for mammals comprising:
    providing a pair of silicone rubber surfaces having their lateral edges spatially adjacent,
    placing a spacer between said surfaces,
    placing at least one strip of a fusible silicon-containing material between and in contact with said surfaces adjacent each of their lateral edges, said strip having a width substantially less than half the width of said surfaces, and said fusible material having a melting temperature greater than the human body temperature of 37° C. but lower than 300° C. and being nontacky at temperatures substantially lower than said melting temperature,
    said fusible silicon-containing material being a soluble organosiloxane block copolymer exhibiting polymeric crystallinity at 25° C. and in which the copolymeric molecules consist essentially of (A) amorphous segments consisting of linked repeating units of the formula $R'_2SiO$ having an average minimum number of at least 10 units of $R'_2SiO$ and (B) crystallite segments consisting of linked repeating units of the formula $-Si(R)_2Z(R)_2SiO-$ having an average minimum number of at least 3 units of $-Si(R)_2Z(R)_2SiO-$, where each R' is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4'biphenylene, 4,4'-diphenylene ether, 4,4'dimethylene benzene and 4,4'-dimethylenediphenyl ether radicals, the molar ratio of total $R'_2SiO$ units to total $-Si(R)_2Z(R)_2SiO-$ units ranging from 10:90 to 95:5.
    applying heat to said fusible material sufficient to cause said material to fuse and adhere to said surfaces, whereby said surfaces are securely bonded together along substantially the length and width of said fusible material when said fusible material is allowed to cool, and said spacer is enveloped by said bonded surfaces.

3. The method as described in claim 1, wherein each R and each R' is a methyl radical and Z is p-phenylene radical, the molar ratio of $R'_2SiO$ units to $-Si(R)_2Z(R)_2SiO-$ units being substantially 75 to 25.

4. The method as described in claim 1, wherein said fusible material is a separate film.

5. The method as described in claim 1, wherein said fusible material is a coating on at least one surface of said silicone material 6. The methods described in claim 2, wherein each R and each R' is a methyl radical and Z is a p-phenylene radical, the molar ratio of R'$_2$SiO units to –Si(R)$_2$Z(R)$_2$SiO– units being substantially 75 to 25.

7. The method as described in claim 2, wherein said fusible material is a separate film.

8. The method as described in claim 2, wherein said fusible material is coating on at least one surface of said silicone material.

9. The method as described in claim 2, wherein said fusible material is caused to adhere to both said surfaces and said spacer.

* * * * *